Figure 3:
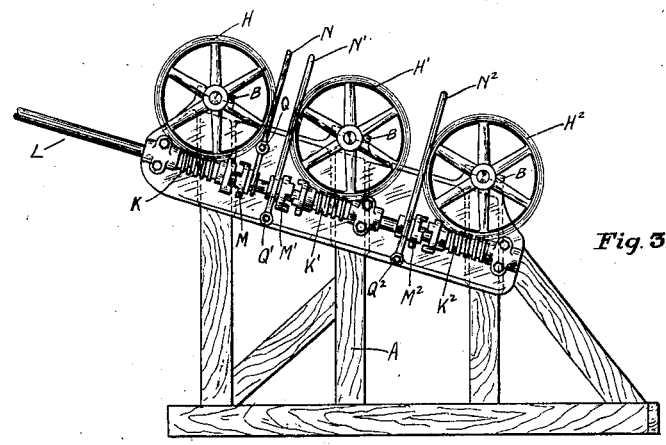

No. 896,781. PATENTED AUG. 25, 1908.
W. R. WEBSTER & W. R. CLARK.
MECHANISM FOR RECEIVING OR DELIVERING TUBES.
APPLICATION FILED JUNE 1, 1907.
2 SHEETS—SHEET 1.
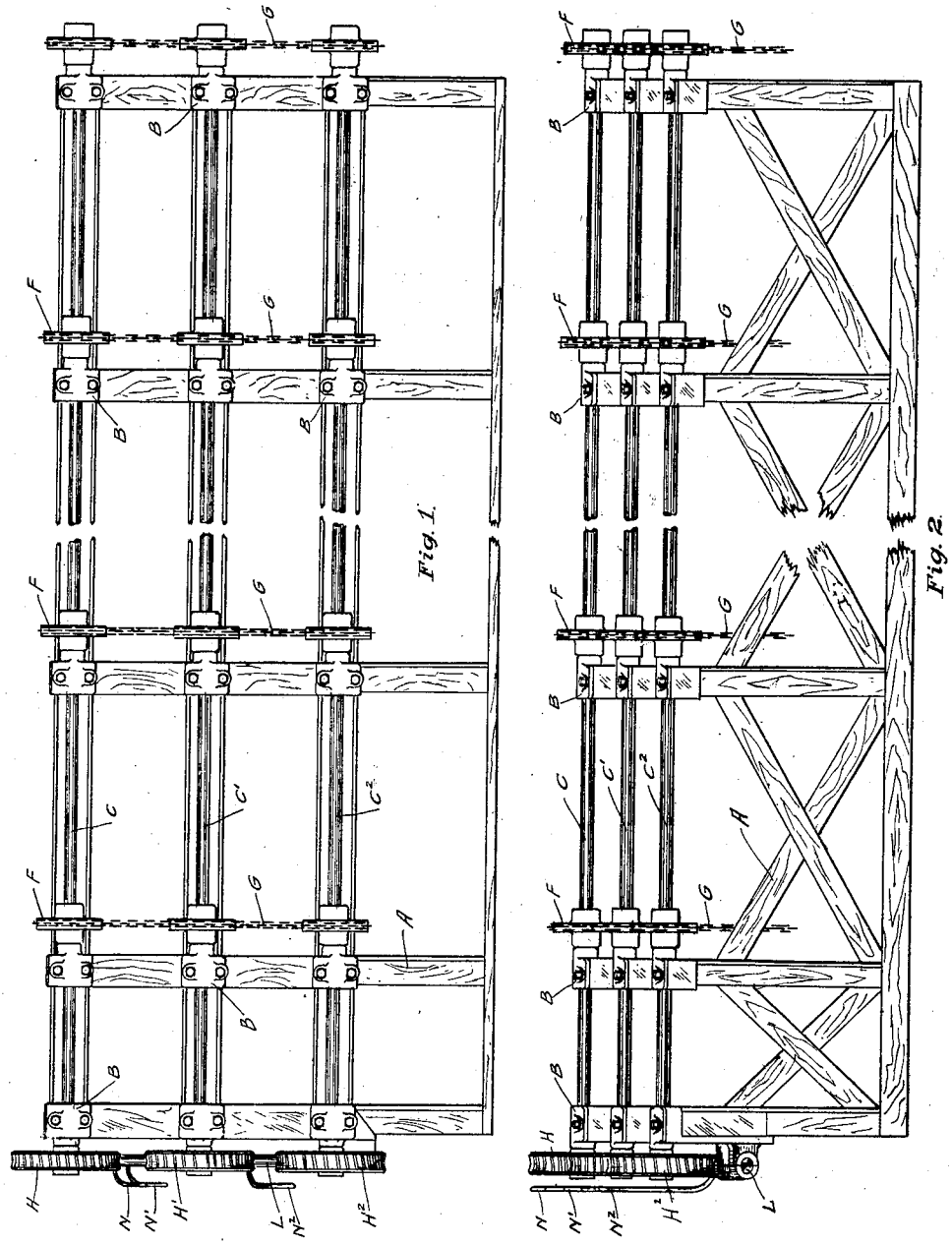
WITNESSES:
INVENTORS
William R. Webster
and Walter R. Clark
BY
ATTORNEYS.

No. 896,781. PATENTED AUG. 25, 1908.
W. R. WEBSTER & W. R. CLARK.
MECHANISM FOR RECEIVING OR DELIVERING TUBES.
APPLICATION FILED JUNE 1, 1907.

2 SHEETS—SHEET 2.

WITNESSES:

INVENTOR
William R. Webster
and Walter R. Clark
BY
Beach o Fish
ATTORNEYS.

THE NORRIS PETERS CO., WASHINGTON, D. C.

UNITED STATES PATENT OFFICE.

WILLIAM R. WEBSTER AND WALTER R. CLARK, OF BRIDGEPORT, CONNECTICUT.

MECHANISM FOR RECEIVING OR DELIVERING TUBES.

No. 896,781.     Specification of Letters Patent.     Patented Aug. 25, 1908.

Application filed June 1, 1907. Serial No. 376,877.

*To all whom it may concern:*

Be it known that we, WILLIAM R. WEBSTER and WALTER R. CLARK, both of the city of Bridgeport, county of Fairfield, and State of Connecticut, have invented new and useful Improvements in Handling Mechanism for Receiving or Delivering Tubes and Similar Articles, of which the following is a full, clear, and exact description, when taken in connection with the accompanying drawings, which form a part thereof.

This invention relates to mechanism for handling tubes or similar articles for convenience in feeding them to or receiving them from machines. When it is desired to feed tubes or similar articles regularly or in succession to a machine from a large number held in a storage receptacle, it is necessary to provide that the delivery will constantly take place at a given point where the feeding mechanism will engage the individual tubes. For convenience and regularity when the tubes are taken by the hand of an operator from the storage receptacle, it is desirable to deliver the tubes at a given point, for unless this is done the operator must vary his motions in reaching for successive tubes.

This invention has for its object the production of a storage receptacle in which a large number of tubes may be deposited, with mechanism by which the tubes from the receptacle are successively and regularly brought to a given point. The principal means by which this is accomplished is by the operation of mechanism for decreasing the cross sectional area of the receptacle.

In the particular form in which the invention is shown in the drawings, the storage receptacle is formed by a plurality of parallel bands or chains on which the tubes may be deposited and which are tightened or loosened to decrease or increase the cross sectional area of the storage space or receptacle.

Another feature of the invention consists of a supplementary storage receptacle which is adapted to feed into the primary storage receptacle, so that while the tubes are being successively fed out from the primary storage receptacle to the machine or operator another quantity of tubes may be collected in the supplementary storage receptacle, either singly or in numbers.

To these, and other ends, an endless band is shown provided, which is so mounted that one portion thereof may be slackened or tightened without materially disturbing the remainder of the chain.

The invention consists of the various improvements and combinations of parts set forth and claimed hereinafter.

Figure 4:
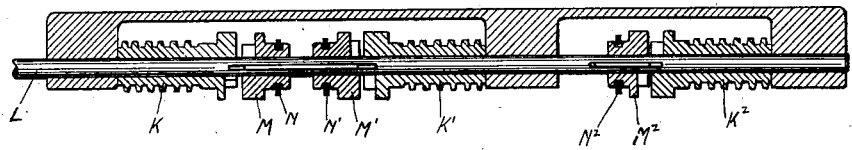
Figures 5, 6:
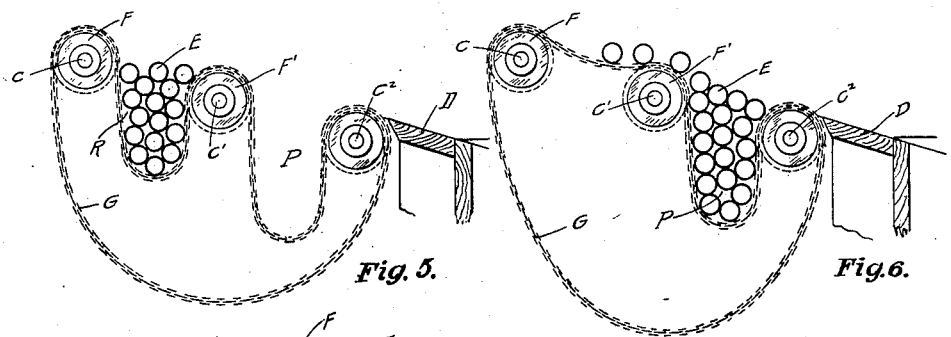
Figure 7:
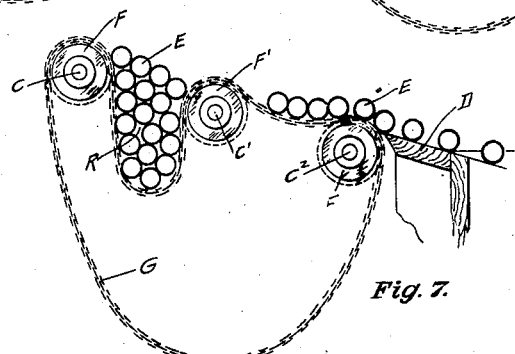

Referring to the drawings, Figure 1 represents a top view of a handling device embodying the invention, Fig. 2, a front view of the same, Fig. 3, an end view, Fig. 4, a substantially horizontal section on the line of the actuating shaft, and Figs. 5, 6 and 7, diagrams showing the chain or band in some of the various positions referred to in the specification.

In all figures, similar letters of reference represent like parts.

The parts designated by the letter A represent a suitable frame work or support, having bearings B for rotary shafts, C, C' and $C^2$. These shafts are suitably spaced from each other and arranged on an incline, as shown more particularly in Figs. 2 and 3. Adjacent to the lowermost shaft $C^2$ are shown in Figs. 5—7 skids D for the reception of the tubes E. The shafts C, C' and $C^2$ are provided at suitable intervals with sprocket wheels F correspondingly located so that each sprocket wheel is in alinement transversely to the length of the shaft with a sprocket wheel on each of the other shafts. Endless chains or bands G pass over and are engaged by the corresponding sprocket wheels on the three shafts. These chains G are of sufficient length to permit a considerable portion to hang slack or loose between the sprocket wheels. The slack portions of the chain between the several shafts form storage receptacles P and R for the tubes, as more clearly indicated in Figs. 5—7.

At the end of the frame A mounted on the shafts C, C' and $C^2$ are gears H, H' and $H^2$ adapted to mesh with worms K, K' and $K^2$ loosely mounted on a driving shaft L, receiving motion in any suitable manner. Keyed to the shaft L are sliding clutches M, M' and $M^2$ adapted to engage the ends of the worms K, K' and $K^2$, respectively. Levers N, N' and $N^2$ are pivoted at Q, Q' and $Q^2$ to the frame A and engage the sliding clutches M, M' and $M^2$, respectively, so that by moving any one of the levers N, N' and $N^2$ the corresponding worm K, K' and $K^2$ will be engaged by a clutch M, M' or $M^2$ to rotate with the shaft L, and transmit such rotation through the particular gear H, H' or $H^2$ meshing therewith to the corresponding shaft C, C' or C². Any one or more of the three shafts C, C' and C² and its sprocket wheel may be thus rotated at will by the operator, while the remaining shaft or shafts remain idle. By this means, a portion of each of the chains G may be set in motion while the remainder is stationary, and each of the portions between the several shafts may be slackened and tightened at will to increase or diminish the cross sectional area of the storage receptacles.

In describing the operation of the mechanism, the position of the parts as shown in Fig. 5 will be assumed to be the normal or original position. As therein shown, the chains are so drawn over the sprocket wheels that there will be depending loops or slack portions between the different shafts. The loops designated by the letter P form the primary storage receptacle, and the loops R the supplementary storage receptacle. The opening in the loop forms the outlet as well as the inlet for the tubes, although as shown herein, the tubes are received at one side of the opening and discharged at the other.

When a number of tubes E are in the supplementary storage spaces R, and it is desired to transfer them to the primary spaces P, the middle shaft C' may be rotated by means of the gear H'. This is done, as already pointed out, when the operator moves the lever N' to bring the clutch M' into engagement with the worm K' so that the rotary movement of the driving shaft L is transmitted to the central shaft C' and its sprocket wheels F'. The rotation of this shaft and its sprocket wheels while the shaft C and its sprocket wheels F are stationary tends to tighten the portions of the chains between these two shafts and to gradually reduce the slack to a straight line (Fig. 6), thus reducing the cross sectional area of the receptacle R. In this movement of the chains G the tubes will be rolled out of the supplementary storage space R over the sprocket F' (as these sprockets are lower than the sprockets of the shaft C) into the primary storage receptacle P.

When the primary storage receptacle is properly charged with tubes, the rotation of the shaft C' may be stopped by the reverse movement of the lever N' to disengage its clutch M' from the worm K' and at the same time the shaft C² may be put into rotation by the movement of the lever N² to engage the clutch M² with the worm K². When the shaft C² is rotated with its sprocket wheels and the shaft C' is held stationary the chains between the two are gradually tightened to substantially a straight line (Fig. 7), so that the slack portion gradually disappears, and in this operation the tubes are rolled out over the sprockets F from the primary storage receptacle P on to the inclined skids D. While the tubes are thus being fed from the primary storage receptacle P to the skids, the lever N may be shifted to engage its clutch M with the worm K to rotate the shaft C. As the shaft C' is stationary the movement of the shaft C will tend to increase the length of chains between the two so that the chain will be slackened, sag downward, and the cross sectional area of the supplementary storage receptacle R increased. Into this receptacle, tubes may be deposited, either singly or in any desired quantities, while the tubes from the primary storage receptacle P are being gradually and regularly fed outward upon the skids. Just before the last tubes are fed outward from the primary receptacle P, the levers N and N' are so shifted as to stop the rotation of the shaft C and begin the rotation of the shaft C', whereupon the tubes may be transferred from the supplementary storage receptacle R to the primary receptacle without interrupting the feeding of the tubes to the skids. Obviously, the rates of speed of the several shafts C, C' and C² may by suitable gearing be regulated so that one or more of the shafts will rotate more rapidly than the others, and the transfer of the tubes from one receptacle take place more rapidly than the tubes are discharged from the other.

By this construction, two storage receptacles are provided, one of which is the primary storage receptacle. When a large number of tubes are placed in this receptacle they are fed regularly and successively to skids D, by decreasing the cross sectional area of the storage receptacle P, through the tightening of the chains or bands G. At the same time, the supplementary storage receptacle may be increased in size for the reception of a bundle of tubes without disturbing the regular movement of the tubes from the primary receptacle, as above described. The tubes of the supplementary storage receptacle are discharged into the primary receptacle by the same diminution of the cross sectional area of this receptacle by the tightening of the chains G, as already pointed out.

This invention is obviously equally applicable for receiving the discharge of tubes from a machine or the hand of an operator, so that in one of the storage receptacles there will be collected a quantity of tubes (without interfering with the regularity of the discharge), which may be removed simultaneously by some agency, such as a traveling crane, etc.

Having now described our invention (which may vary in its details without departing from the spirit thereof), what we claim and desire to secure by Letters Patent, is:—

1. In handling mechanism for tubes, or similar articles, the combination with a storage receptacle for a plurality of blanks, having an opening or outlet; of mechanism adapted to raise the blanks to the outlet by diminishing the cross sectional area of the receptacle, substantially as described.

2. In handling mechanism for tubes, or similar articles, the combination with a storage receptacle for a plurality of tubes, having an opening or outlet; of mechanism adapted to deliver the blanks at the outlet by diminishing the cross sectional area of the receptacle; and a supplementary storage receptacle discharging into the primary receptacle, substantially as described.

3. In handling mechanism for tubes, or similar articles, the combination with a storage receptacle for a plurality of blanks, having an opening or outlet; of a supplementary storage receptacle discharging into said primary receptacle; and mechanism adapted to discharge the blanks from said receptacles by diminishing the cross sectional area of the receptacles, substantially as described.

4. In handling mechanism for tubes, or similar articles, the combination with a band or chain forming a receptacle for a plurality of blanks; of fixed supports therefor; and mechanism for tightening or slacking said band or chain as desired, so as to diminish or increase the cross sectional area of said receptacle, substantially as described.

5. In handling mechanism for tubes, or similar articles, the combination with a plurality of bands or chains forming a receptacle for a plurality of blanks; of fixed supports therefor; and mechanism for slacking or tightening said bands or chains simultaneously as desired, so as to diminish or increase the cross sectional area of said receptacle, substantially as described.

6. In handling mechanism for tubes or similar articles, the combination with a plurality of bands or chains adapted to hold the tubes; of supports therefor arranged on an incline; and mechanism for slacking or tightening said bands or chains, substantially as described.

7. In handling mechanism for tubes or similar articles, the combination with a band or chain forming a series of receptacles for a plurality of blanks; of a series of supports therefor; and means for slacking or tightening the portion of the band or chain between adjacent supports separately, so as to diminish or increase the cross sectional area of one of the receptacles separately, substantially as described.

8. In handling mechanism, for tubes or similar articles, the combination with an endless band or chain forming a receptacle for a plurality of blanks; of supports therefor; and means for slacking or tightening the portion of said band or chain between said supports as desired, so as to diminish or increase the cross sectional area of said receptacle substantially as described.

9. In handling mechanism for tubes or similar articles, the combination with an endless band or chain forming a series of receptacles for a plurality of blanks; of a plurality of rotary supports therefor engaging said chain or band; and means for rotating one of said supports independently of the other, so as to diminish or increase the cross sectional area of one of said receptacles separately, substantially as described.

10. In handling mechanism for tubes or similar articles, the combination with an endless band or chain forming a series of receptacles for a plurality of blanks; of a series of rotary supports therefor engaging said band or chain; and means for rotating one or more of said supports independently of the others for slacking or tightening the portions of said band or chain between adjacent supports, so as to diminish or increase the cross sectional area of one of said receptacles separately, substantially as described.

11. In handling mechanism for tubes or similar articles, the combination with an endless band or chain adapted to hold the tubes; of a plurality of rotary supports therefor arranged on an incline and engaging said band or chain; and means for rotating one or more of said supports independently of the others, substantially as described.

12. In handling mechanism for tubes or similar articles, the combination with a plurality of endless bands or chains adapted to hold the tubes; of a series of rotary supports arranged on an incline and engaging said bands or chains; and means for rotating some of said supports independently of the others to simultaneously tighten or loosen a portion or portions of said bands or chains, substantially as described.

13. In handling mechanism for tubes or similar articles, the combination with a band or chain forming a receptacle for a plurality of blanks; of supports therefor and mechanism adapted to diminish or increase the length of said band or chain between said supports so as to diminish or increase the cross sectional area of said receptacle, substantially as described.

In witness whereof, we have hereunto set our hands on the 21st day of May, 1907.

WILLIAM R. WEBSTER. [L. S.]
    WALTER R. CLARK.  [L. S.]

Witnesses:
 A. M. BALDWIN,
 HAROLD C. SELTENRICH.